United States Patent Office 3,054,772
Patented Sept. 18, 1962

3,054,772
PRODUCTION OF POLYCARBONATES
Bart Paul Jibben, Arnhem, and Henricus Gerardus Joseph Overmars, Zeist, Netherlands, assignors, by mesne assignments, to N.V. Onderzoekingsinstituut Research, Arnhem, Netherlands, a corporation of Netherlands
No Drawing. Filed May 14, 1958, Ser. No. 735,109
Claims priority, application Netherlands May 16, 1957
7 Claims. (Cl. 260—47)

The present invention relates to the production of polycarbonates and more particularly to a process for the preparation of macromolecular aromatic polycarbonates and to such polycarbonates per se.

The preparation of macromolecular polycarbonates containing aromatic groups, in which at least one organic dihydroxy compound is reacted in the presence of an acid-binding substance with phosgene and/or a chlorocarbonic acid ester of organic dihydroxy compounds has been described heretofore. It is also known that various substances such as quaternary ammonium compounds in the form of free bases or salts thereof will accelerate the polycondensation of these reactants. However, the physical characteristics of the prior art polycarbonates are not entirely satisfactory; and the polycondensation does not proceed at a desirable speed.

Therefore, it is an object of this invention to provide a macromolecular polycarbonate having improved properties.

Another object of this invention is to provide a process for the preparation of a macromolecular polycarbonate having improved properties.

Other objects will become apparent from the following detailed description.

In accordance with the present invention these aforesaid objects are accomplished by chemically modifying a macromolecular polycarbonate by the action of an aldehyde. The polycarbonate contains aromatic groups and is the polycondensation product of at least one organic dihydroxy compound reacted with phosgene and/or a chlorocarbonic acid ester of organic dihydroxy compounds, said product being prepared in the presence of an acid-binding substance.

It has been found that aldehydes not only cause a modification of the polycarbonates, that is possibly the result of the formation of crosslinks in the polymer, but also accelerate the polycondensation to a higher degree than the aforesaid quaternary ammonium catalysts.

In carrying out the process of the present invention, aliphatic, alicyclic, and aromatic aldehydes can be advantageously employed. Examples of these aldehydes are formaldehyde, acetaldehyde, propionaldehyde, butyraldehyde, enanthaldehyde, palmitaldehyde, hexahydrobenzaldehyde, and benzaldehyde. It will be appreciated that substances that under reaction conditions produce an aldehyde may also be employed. These substances include, for example, hexamethylenetetramine and cyclic or linear polymers of aldehydes, such as paraformaldehyde and paracetaldehyde.

The organic dihydroxy compounds used in the prior art processes, as well as in the present invention, may be aromatic, aliphatic and/or alicyclic.

Illustrative of aromatic compounds are dimonohydroxyarylalkanes, of which many variations are possible. For example, the aryl moiety of the dimonohydroxyarylalkanes may or may not be identical. The alkyl moiety connecting the two benzene rings of the dimonohydroxyarylalkanes may consist either of an aliphatic chain or of an alicyclic ring and may be substituted by an aryl moiety.

Specific representatives of the aforementioned dimonohydroxyarylalkanes are: (4,4'-dihydroxydiphenyl) methane, 2,2-(4,4'-dihydroxydiphenyl) propane, 1.1-(4,4'-dihydroxydiphenyl) cyclohexane, 1,1-(4,4'-dihydroxy-3,3'-dimethyl-diphenyl) cyclohexane, 2,2-(2,2'-dihydroxy-4,4'-di-t-butyl-diphenyl) propane, 3,4-(4,4'-dihydroxydiphenyl) hexane, 1,1-(4,4'-dihydroxydiphenyl)-1-phenyl ethane, 2,2-(4,4'-dihydroxydiphenyl) butane, 2,2-(4,4'-dihydroxydiphenyl) pentane, 3,3-(4,4'-dihydroxydiphenyl) pentane, 2,2-(4,4'-dihydroxydiphenyl)-3 methyl butane, 2-2'-(4,4'-dihydroxydiphenyl) hexane, 2,2-(4,4'-dihydroxydiphenyl) 4 methyl pentane, 2,2-(4,4'-dihydroxydiphenyl) heptane, 4,4(4,4'-dihydroxydiphenyl) heptane, and 2,2(4,4'-dihydroxydiphenyl) tridecane.

Examples of other aromatic dihydroxy compounds are: hydroquinone, resorcinol, pyrocatechol, 4,4'-dihydroxydiphenyl, 2,2'-dihydroxydiphenyl, 1,4-dihydroxynaphthalene, 1,6-dihydroxynaphthalene, 2,6-dihydroxynaphthalene, 1,2-dihydroxynaphthalene, 1,5-dihydroxyanthracene, 2,6-dihydroxyquinoline, and 2,2'-dihydroxydinaphthyl-1,1'.

Examples of aliphatic and alicyclic dihydroxy compounds are: ethyleneglycol, diethyleneglycol, triethyleneglycol, polyethyleneglycol, thiodiglycol, propanediol-1,2 and the di- or polyglycols prepared from propyleneoxide-1,2, propanediol-1,3, butanediol-1,3, butanediol-1,4, 2-methylpropanediol-1,3, pentanediol-1,5,2-ethylpropanediol-1,3, hexanediol-1,6, octanediol-1,8,2-ethylhexanediol-1,3, decanediol-1,10, cyclohexanediol-1,2,2,2-(4,4'-dihydroxydicyclohexyl) propane, and 2,6-dihydroxydecahydronaphthalene.

Where aliphatic or alicyclic dihydroxy compounds are used it will be appreciated, that for obtaining polycarbonates containing aromatic groups it is necessary that mixtures of these aliphatic or alicyclic dihydroxy compounds and aromatic dihydroxy compounds are reacted with phosgene or chlorocarbonic acid esters of organic dihydroxy compounds, or that the aliphatic or alicyclic dihydroxy compounds are reacted with chlorocarbonic acid esters of dihydroxy compounds containing aromatic groups.

Examples of chlorocarbonic acid esters of organic dihydroxy compounds that can be employed include the chlorocarbonic acid esters of the above mentioned dihydroxy compounds.

Examples of acid-binding substances are bases of alkali metals, preferably sodium hydroxide, acid-binding salts, and organic bases, preferably pyridine. These acid-binding substances may be brought into the reaction mixture while bound to the organic dihydroxy compounds.

The aromatic polycarbonates can be readily manufactured in a variety of ways. For example, the organic dihydroxy compounds may be converted as dichlorocarbonic acid esters with approximately equimolar amounts of the free organic dihydroxy compounds, in the presence of an acid-binding substance, either in a solution or suspension. The polycarbonates can also be prepared by introducing phosgene into solutions or suspensions of the organic dihydroxy compounds in organic bases, such as pyridine, or into solutions or suspensions of the organic dihydroxy compounds in inert organic solvents, such as chloroform, in the presence of an acid-binding substance, such as pyridine.

By employing suitable solvents, the aromatic polycarbonates may be obtained in solution. The polymer may be precipitated or otherwise recovered from the solution.

Furthermore, the polycarbonates can also be prepared by introducing phosgene into aqueous solutions or suspensions of alkali derivatives of the organic dihydroxy compounds. In this case, the polycarbonates during their formation are precipitated in the form of a powder.

The formation of the polycarbonates by the introduction of phosgene in aqueous solutions or suspensions is promoted by the addition of solvents in which phosgene dissolves. For example, when chlorine derivatives of lower alkanes, such as dichloromethane and 1,2-dichloroethane are added in sufficient amounts, the polycarbonates are obtained in solution.

The above described aldehydes can be brought into reaction in different ways. According to one method of the present invention, the aldehydes can be brought into reaction with the aromatic polycarbonate-forming materials before polycondensation.

According to a second method, the aldehydes can be added to the reaction mixture at the beginning of, or during, the polycondensation. Preferably, the addition is made at a very early state of the polycondensation in order to receive full advantage of the catalytic action of the aldehydes.

In these just described alternative methods, the aldehydes seem to be bound initially to the aromatic groups in the form of reactive substituents, which during polycondensation result in the formation of cross-links in the polymer.

According to a third alternative method, the aldehydes are brought into reaction with the polycarbonates near the end of the polycondensation or after the polycondensation is complete. Therefore, benefit is derived only from the modifying action of the aldehydes, and not from their accelerating action. In this event the aldehyde modification can be induced only by exposing the polycarbonate and the aldehydes to an elevated temperature, preferably in an acid medium.

The amounts in which the aldehydes are applied may vary within wide limits, depending upon the desired acceleration of the poly-condensation and the modification of the polycarbonates.

The amount of aldehyde which is brought into reaction, preferably does not exceed 20 mole percent, calculated on the organic dihydroxy portion bound in the polymer.

It has further been found that by employing aldehydes in combination with quaternary ammonium compounds, the speed at which the polycondensation proceeds is greatly increased. This increased speed was not to be expected when the catalytic properties of either the aldehydes or the quaternary ammonium compounds are considered.

In order to prevent oxidation, the preparation of the aromatic polycarbonates is preferably carried out in the presence of reducing agents.

The aldehyde-modified macromolecular aromatic polycarbonates produced according to the process of the present invention do not decompose upon melting and therefore can be processed into shaped articles by extruding or injection molding according to conventional practice used in thermoplastic technology. The polycarbonates in the form of a powder can be flamesprayed. Threads, fibers, films, and foils manufactured from a melt or from a solution of the modified polycarbonates can be oriented by cold as well as by hot drawing.

To illustrate the manner in which the invention may be carried out, the following example is given. It is to be understood, however, the example is for the purpose of illustration and the invention is not to be regarded as limited to any of the specific materials or conditions recited therein.

*Example*

Into a mixture containing 137.5 parts by weight of 2,2-(4,4'-dihydroxydiphenyl) propane, 900 parts by weight of water, 330 parts by weight of dichloromethane, 68.5 parts by weight of sodium hydroxide and 2 parts by weight of an aqueous formaldehyde solution of 40% by weight, 71.5 parts by weight of phosgene were introduced in 100 minutes, while stirring the mixture at 25° C. Thereupon 4.8 parts by weight of tetra-n-butylammonium iodide were added. Between 10-20 minutes after the addition a very tough dough-like substance was formed. After conventional purification a modified macromolecular polycarbonate was obtained.

A film manufactured from this polycarbonate was perfectly clear and colorless.

Since many different embodiments of the invention may be made without departing from the spirit and scope thereof, it is to be understood that the invention is not limited by the above specific illustrations except to the extent of the following claims.

What is claimed is:

1. A process for the preparation of macromolecular polycarbonates comprising reacting an organic dimonohydroxy aryl alkane with a compound selected from the group consisting of phosgene and a chlorocarbonic acid ester of an organic dimonohydroxy aryl alkane to form said polycarbonate in the presence of catalytic amounts of formaldehyde as the promoter of the polyesterification reaction and an acid-binding substance.

2. A process for the preparation of a macromolecular polycarbonate comprising reacting an organic dimonohydroxy aryl alkane with a compound selected from the group consisting of phosgene and a chlorocarbonic acid ester of an organic dimonohydroxy aryl alkane to form said polycarbonate in the presence of an acid-binding substance, a quaternary ammonium compound that accelerates the reaction, and formaldehyde in an amount sufficient to catalyze the polyesterification reaction.

3. A process for the preparation of a macromolecular polycarbonate comprising reacting a dihydroxydiarylalkane with phosgene to form said polycarbonate in the presence of formaldehyde in an amount sufficient to catalyze the polyesterification reaction and an acid-binding substance.

4. A process for the preparation of a macromolecular polycarbonate comprising reacting a dihydroxydiarylalkane with phosgene in a medium in which phosgene is soluble to form said polycarbonate in the presence of formaldehyde in an amount sufficient to catalyze the polyesterification reaction and an acid-binding substance.

5. The process as defined in claim 4 wherein said medium comprises a chlorine derivative of a lower alkane.

6. A process for the preparation of a macromolecular polycarbonate comprising reacting 2,2-(4,4'-dihydroxydiphenyl) propane with phosgene to form said polycarbonate in the presence of formaldehyde in an amount sufficient to catalyze the polyesterification reaction.

7. A process for the preparation of a macromolecular polycarbonate comprising reaction 2,2-(4,4'-dihydroxydiphenyl) propane with phosgene in a liquid medium composed of water and dichloromethane to form said polycarbonate in the presence of sodium hydroxide, tetra-n-butylammonium iodide and formaldehyde in an amount sufficient to catalyze the polyesterification reaction, purifying the thus-formed polycarbonate and forming a film therefrom which is colorless and clear.

References Cited in the file of this patent

UNITED STATES PATENTS

| | | |
|---|---|---|
| 1,697,713 | Bucherer | Jan. 1, 1929 |
| 1,933,124 | Seebach et al. | Oct. 31, 1933 |
| 2,027,337 | Heck | Jan. 7, 1936 |
| 2,493,075 | La Lande et al. | Jan. 3, 1950 |
| 2,874,046 | Klockgether et al. | Feb. 17, 1959 |

FOREIGN PATENTS

| | | |
|---|---|---|
| 546,375 | Belgium | Mar. 23, 1956 |

OTHER REFERENCES

Carswell: "Phenoplasts," High Polymer Series, vol. VII, Interscience Pub., N.Y., 1947, page 35. Copy in Div. 60.

Schnell: Angewante Chemie, vol. 68, No. 20, pages 633-640, Oct. 21, 1956. Copy in Sci. Library, English translation in Div. 60, 30 pages.